United States Patent [19]

Bauer et al.

[11] Patent Number: 5,280,128
[45] Date of Patent: Jan. 18, 1994

[54] PROCESS FOR THE PREPARATION OF BENZOTHIOXANTHENE DYESTUFFS

[75] Inventors: Wolfgang Bauer, Maintal; Eberhard Grimm, Offenbach; Uwe Nickel, Bad Homburg; Manfred Schrod, Weiterstadt; Herbert Wille, Frankfurt, all of Fed. Rep. of Germany

[73] Assignee: Cassella Aktiengesellschaft, Frankfurt, Fed. Rep. of Germany

[21] Appl. No.: 805,897

[22] Filed: Dec. 12, 1991

[30] Foreign Application Priority Data

Dec. 24, 1990 [DE] Fed. Rep. of Germany ....... 4041853

[51] Int. Cl.$^5$ .................. C07D 335/04; C07D 335/10
[52] U.S. Cl. ...................................... 549/24; 564/426; 564/430; 564/440
[58] Field of Search .................. 549/24; 564/308, 440, 564/430, 426

[56] References Cited

U.S. PATENT DOCUMENTS

| | | | |
|---|---|---|---|
| 3,828,072 | 8/1974 | Spietschka et al. | 549/24 |
| 3,829,434 | 8/1974 | Spietschka et al. | 549/24 |
| 4,740,604 | 4/1988 | Weis et al. | 549/297 |
| 4,863,482 | 9/1989 | Junino et al. | 564/440 |

FOREIGN PATENT DOCUMENTS

| | | |
|---|---|---|
| 1293939 | 4/1969 | Fed. Rep. of Germany . |
| 2134517 | 12/1972 | Fed. Rep. of Germany . |
| 2145992 | 2/1973 | France . |

OTHER PUBLICATIONS

Patent Abstracts of Japan, vol. 10, No. 355 of JP-A-61 155 465, "Benzo(Thio)Xanthene Compound and Liquid Crystal Compound Containing Same", Nov. 29, 1986.
Carlini et al., Dyes and Pigments, vol. 3, No. 1, "New Daylight Fluorescent Pigments", pp. 59-69 (1982).
Houben-Weyl, "Methoden der Organischen Chemie", vol. VI/1c, p. 247 (1976).
"Ullmann's Encyclopedia of Industrial Chemistry", vol. V, p. 812 (1954).
Hoechst, "Din-Sicherhertsdolenblatt", (Jun. 1, 1989).

Primary Examiner—Richard L. Raymond
Attorney, Agent, or Firm—Connolly and Hutz

[57] ABSTRACT

The present invention relates to a process for the preparation of benzothioxanthene dyestuffs and cyclisation of 3-(2'-aminophenylthio)-benzanathrones wherein the diazotisation and cyclisation are carried out simultaneously in polar, aprotic solvent in the presence of water.

10 Claims, No Drawings

PROCESS FOR THE PREPARATION OF BENZOTHIOXANTHENE DYESTUFFS

The present invention relates to a process for the preparation of benzothioxanthene dyestuffs by diazotisation and cyclisation of 3-(2'-aminophenylthio)-benzanthrones.

Various processes of this type are already known. DE-PS No. 1,293,939 thus describes the diazotisation of 3-(2'-aminophenylthio)-benzanthrones in acetic or mineral acid solution and the cyclisation of the resulting diazonium salt in the presence of cooper salts or copper powder. This process has a poor space yield and leads to high pollution of the effluent with copper salts. The products are furthermore obtained in heavily contaminated form in this process, so that they have to be purified in an expensive manner by treatment with organic solvents. This is associated with further ecological and economical disadvantages.

According to DE-PS No. 2,134,517, 3-(2'-aminophenylthio)benzanthrones are converted into tertiary amines at temperatures of −10° C. to 0° C. using compounds which split off nitrosyl groups, for example nitrosyl sulphuric acid, and the diazonium compounds thus obtained are heated to 100° C. to 115° C. This process has disadvantages because of the high toxicity of the solvents of pyridine or pyridine based mixtures, so that high industrial expenditure i-s necessary in respect of solvent regeneration and keeping the waste air and effluent pure.

DE-PS No. 2,134,518 describes the reaction of 3-(2'-aminophenylthio)-benzanthrones with compounds which split off nitrosyl groups in N,N-dialkylated acid amides at temperatures of −10° C. to 5° C. to give diazonium compounds, and subsequent cyclisation thereof in the presence of copper, copper salts or acid-binding agents at 115° C. According to this process, the products are obtained with a high degree of purity, but the yields are not more than 58% of theory, based on the amino compounds employed. The process is accordingly uneconomical because of the high proportion of by-by-products which pollute the effluent or have to be disposed of. This process moreover raises safety problems. For example, on heating the diazonium salt obtained according to Example 2 of DE-PS No. 2,134,518, the heat flow of the reaction from 60° C. determined by heat balance calorimetry rises exponentially, so that it can no longer be guaranteed that the reaction is controlled from the safety aspects. An adiabatic increase in temperature of 106.2° C. has been determined here for the overall reaction.

The object of the present invention is to prepare benzothioxanthene dyestuffs in an ecologically and economically optimum manner, that is to say in a high yield and purity with the minimum possible pollution of the environment.

The object is achieved by a process for the reparation of benzothioxanthene dyestuffs of the general formula I

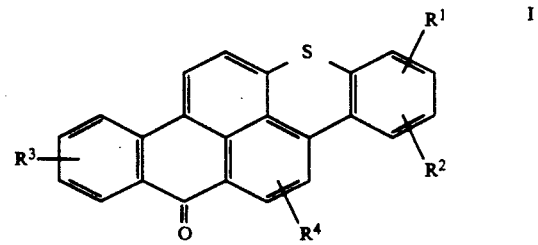

wherein
$R^1$ and $R^2$ independently of one another denote hydrogen, $(C_1-C_2)$-alkyl, $(C_1-C_2)$-alkoxy or chlorine and
$R^3$ and $R^4$ independently of one another denote hydrogen or bromine, by diazotisation and cyclisation of 3-(2'-aminophenylthio)-benzanthrones of the general formula II

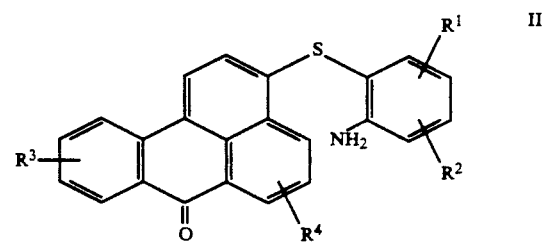

wherein $R^1$ to $R^4$ are defined as mentioned above, characterised in that the diazotisation and cyclisation are carried out simultaneously in polar, aprotic solvents in the presence of water.

In the general formula I, $R^1$ to $R^4$ preferably denote hydrogen.

Examples of preferred polar, aprotic solvents are dialkylated acid amides, such as dimethylformamide, dimethylacetamide, N-methylpyrrolid-2-one, N-methylpiperid-2-one and N-formylmorpholine, urea derivatives, such as tetramethylurea, tetraethylurea, 1,3-dimethylimidazolin-2-one and 1,3-dimethyl-3,4,5,6-tetrahydro- 2(1H)-pyrimidone, sulphoxides, such as dimethylsulphoxide, sulphones, such as sulpholane, and alkylnitriles, such as acetonitrile and propionitrile. N-Methylpyrrolid-2-one and dimethyl sulphoxide are particularly preferred.

Water is preferably employed in amounts of 0.5 to 15% by weight, preferably 2 to 10% by weight, based on the solvent.

The diazotisation of the compounds of the general formula II is effected in a manner which is known per se, for example with an alkali metal nitrite, in particular sodium nitrite, in the presence of mineral, alkanesulphonic or arenesulphonic acids, or with nitrosylsulphuric acid, nitrosyl chloride or nitrous acid esters, such as, for example, isoamylnitrite or nitrous acid monoglycol ester as compounds which supply nitrosyl groups.

The compounds which supply nitrosyl groups are advantageously employed in an excess of 5 to 70 mol %, preferably 10 to 50 mol %, based on the compound of the general formula II.

Examples of mineral acids required when an alkali metal nitrite is used are hydrochloric acid, sulphuric acid and phosphoric acid. Examples of alkane- and arenesulphonic acids are methanesulphonic acid, ethanesulphonic acid, butanesulphonic acid, trifluoromethanesulphonic acid, benzenesulphonic acid and 4-methylbenzenesulphonic acid.

The reaction according to the invention is preferably carried out at temperatures of 20° to 120° C., particularly preferably 40° to 80° C.

In one embodiment of the process according to the invention, the compound of the general formula II is initially introduced into the reaction vessel in the solvent, together with water and if appropriate an acid, and the compound which supplies nitrosyl groups is added. In another embodiment, the compound of the general formula II is initially introduced into the reaction vessel in the solvent, together with water and an alkali metal nitrite, and an acid-is added.

In another preferred embodiment of the process according to the invention, the compounds of the general formula II are first prepared by reaction of 2-aminothiophenols of the general formula III

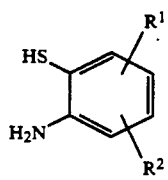

wherein $R^1$ and $R^2$ are as defined above, with 3-halogenobenzanthrones of the general formula IV

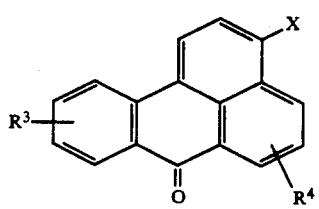

wherein X denotes chlorine or bromine and $R^3$ and $R^4$ are as defined above, in polar, aprotic solvents and these products arediazotised and cyclised according to the invention without intermediate isolation.

The compounds of the general formulae III and IV are known and can be prepared by known methods.

The process according to the invention, in which, surprisingly, the addition of copper, copper salts or acid-binding agents can be dispensed with, provides the benzothioxanthene dyestuffs of the general formula I in a surprisingly high yield of up to 95% of theory, based on the compound of the general formula II, and with a very good purity. A high purity is absolutely essential for use as fluorescence dyestuffs for synthetic fibres and plastics. The process according to the invention thus offers clear ecological and economic advantages in comparison with the processes known to date.

Furthermore, there are also considerable advantages from safety aspects. The heat flow of the reaction is considerably easier to control than in the known reactions. The adiabatic increase in temperature for the overall reaction is only 61.3° C.

Furthermore, it could not be predicted that the intermediately formed diazonium salts of the compound of the general formula II produce better yields of cyclisation product of the general formula I in the presence of water than in an anhydrous medium according to the known processes. On the basis of the prior art, it would in fact have been expected that phenols are formed by boiling of the diazonium salts (see, for example, Houben-Weyl, Methoden der Organischen Chemie (Methods of Organic Chemistry), Volume VI/1c page 247 (1976); Ullmann's Enzyklopadie der Technischen Chemie (Ullmann's Encyclopedia of Industrial Chemistry), Volume V, page 812 (1954).

EXAMPLE 1

70.6 g of 3-(2'-aminophenylthio)-benzanthrone are introduced into 700 g of 99% pure N-methylpyrrolidone, and 20.7 g of sodium nitrite and 32.0 g of water are added at 25° C. The mixture is subsequently heated to 45° C., and 25.0 g of methanesulphonic acid are added in the course of 3 hours. The reaction is brought to completion by subsequent stirring at 70° C. until the evolution of nitrogen has ended.

The mixture is cooled to 100 and filtered, and the filter cake is rinsed with 150 g of N-methylpyrrolidone and 400 g of water. After drying at 110° C., 59.7 g (87% of theory) of the red dyestuff of the formula I ($R^1$ to $R^4$=H) are obtained with a purity of 98% (extinction measurement at λmax: 510 μm).

EXAMPLE 2

A solution of 21.6 g of sodium nitrite in 35 g of water is added to a mixture of 70.6 g of 3-(2'-aminophenylthio)-benzanthrone, 25.0 g of methanesulphonic acid, 20 g of water and 700 g of 99% pure N-methylpyrrolidone at 45° in the course of 3 hours, and the mixture is then heated to 90°. After cooling to 10° C. and working up analogously to Example 1, 58.3 g (84% of theory) of the dyestuff of the formula 1 ($R^1$ to $R^4$=H) are obtained with a purity of 97% (λmax: 510 μm).

If the procedure is carried out according to the instructions in Example 1, but methanesulphonic acid is replaced by the acids shown in column 2 of Table 1 and N-methylpyrrolidone is replaced by the solvent shown in column 3, the dyestuff of the formula I ($R^1$ to $R^4$=H) is likewise obtained in a high yield and with a purity of 95%-100%.

TABLE 1

| Example | Acid | Polar, aprotic solvent | Yield (% of theory) |
|---|---|---|---|
| 3 | 25.0 g of 96% strength sulphuric acid | N-methylpyrrolid-2-one | 83 |
| 4 | 29.6 g of 85% strength phosphoric acid | N-methylpyrrolidone | 80 |
| 5 | 48.2 g of 4-methylbenzenesulphonic acid | N-methylpyrrolidone | 79 |
| 6 | 30.2 g of 32% strength hydrochloric acid | 1,3-dimethylimidazolin-2-one | 76 |
| 7 | 30.2 g of 32% strength hydrochloric acid | Sulpholane | 75 |
| 8 | 25.0 g of methanesulphonic acid | Dimethylformamide | 77 |
| 9 | 25.0 g of methanesulphonic acid | Dimethylacetamide | 79 |
| 10 | 25.0 g of methanesulphonic acid | Tetramethylurea | 84 |
| 11 | 30.2 g of 32% strength hydrochloric acid | Acetonitrile | 77 |
| 12 | 25.0 g of methanesulphonic acid | Tetraethylurea | 81 |
| 13 | 25.0 g of methanesulphonic acid | 1,3-dimethyl-3,4,5,6-tetrahydro-2-(1H)-pyrimidone | 75 |

TABLE 1-continued

| Example | Acid | Polar, aprotic solvent | Yield (% of theory) |
|---|---|---|---|
| 14 | 30.2 g of 32% strength hydrochloric acid | Dimethylsulphoxide | 95 |

EXAMPLE 15

20.5 g of ground sodium hydroxide are added to a solution of 63.2 g of 2-aminothiophenol in 400 g of 99% pure N-methylpyrrolid-2-one and the mixture is stirred at 60° C. for 1 hour under a nitrogen atmosphere. A solution of 154.6 g of 3-bromobenzanthrone in 850 g of 99% pure N-methylpyrrolidone is then added and the condensation reaction is brought to completion by subsequent stirring at 80° C.

58.0 g of water and 51.75 g of sodium nitrite are then added, and 75.4 g of 32% strength hydrochloric acid are slowly metered in at 50° C. To bring the cyclisation reaction to completion, the mixture is subsequently stirred at 70° for 3 hours, cooled to 5° C. and filtered and the press cake is rinsed with 700 g of N-methylpyrrolid-2-one and 2.0 l of water. The dyestuff paste is dried at 110° C.

Yield: 135.9 g (80% of theory) of a red powder of the dyestuff of the formula I ($R^1$ to $R^4$=H)

Purity: 99% (extinction measurement at λmax: 510 μm).

The adiabatic increase in temperature of the reaction is determined by heat balance calorimetry (Mettler RC-1 calorimeter). The following values result for the mean of the reaction steps:

| | adiabatic increase in temperature (°C.) |
|---|---|
| Hydrochloric acid addition | 41.4 |
| Heating to 70° and subsequent stirring at 70° | 21.8 |
| Overall reaction | 61.3 |

COMPARISON EXAMPLE (Corresponding to Example 2 of DE-PS No. 2,134,518)

106.0 g of 3-(2'-aminophenylthio)-benzanthrone are introduced into 720 g of 99% pure N-methylpyrrolidone at 25° C., the mixture is cooled to −5°, and 114.9 g of 40.5% strength nitrosylsulphuric acid are added at −5° to 0° C. in the course of 1 hour.

The cooling is then removed and the mixture is warmed to 23° C. in the course of 30 minutes and subsequently stirred at 23° C. for 3 hours. The mixture is then heated to 110° C. in the course of 1 hour and subsequently stirred at 110° C. for 3 hours. It is then cooled to 5° C. and filtered, and the filter cake is rinsed with 420 g of N-methylpyrrolid-2-one and 1.4 l of water. After drying at 110° C., 57.6 g (56% of theory) of the dyestuff of the formula I ($R^1$ to $R^2$=H) are obtained with a purity of 98% (extinction measurement at λmax: 510 μm).

The adiabatic increase in temperature of the reaction is measured by heat balance calorimetry (Mettler RC 1 calorimeter). The following values result for the individual reaction steps:

| | adiabatic increase in temperature (°C.) |
|---|---|
| Addition of nitrosylsulphuric acid | 22.2 |
| Subsequent stirring at 23° C. | 44.3 |
| Heating to 110° C. and subsequent stirring (3 hours) at 110° C. | 57.9 |
| Overall reaction | 106.2 |

An exponential rise in the heat flow is to be found at 60° C.

If the procedure is carried out according to the instructions of Example 16, but instead of 2-aminothiophenol the substituted 2-aminothiophenols shown in Table 2, column 2 are employed and the benzanthrone derivative shown in column 3 is employed, the substituted dyestuffs of the formula I shown in column 4 are obtained in a yield of 75%–80% of theory and with a high purity of >95%.

TABLE 2

| Example | 2-Aminothiophenol of the formula III | Benzanthrone of the formula IV | Benzothioxanthene dyestuff of the formula I |
|---|---|---|---|
| 16 | 2-Aminothiophenol | 3,9-Dibromobenzanthrone | |
| 17 | 2-Amino-5-ethoxy-thiophenol | 3-Bromobenzanthrone | |

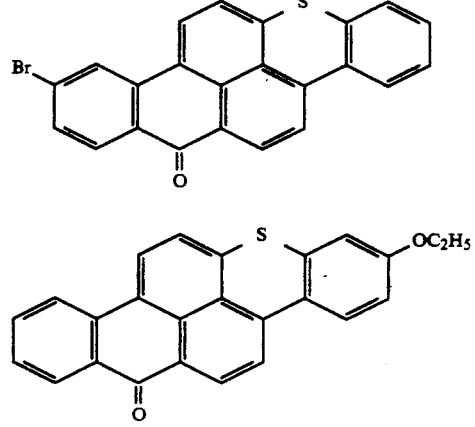

TABLE 2-continued

| Example | 2-Aminothiophenol of the formula III | Benzanthrone of the formula IV | Benzothioxanthene dyestuff of the formula I |
|---|---|---|---|
| 18 | 2-Amino-5-chloro-3-methylthiophenol | 3-Bromobenzanthrone | 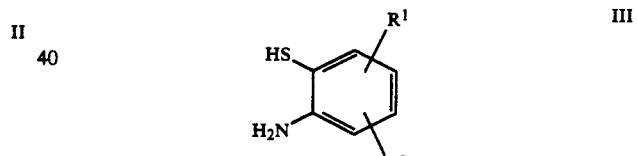 |

We claim:

1. Process for the preparation of benzothioxanthene dyestuffs of the general formula I

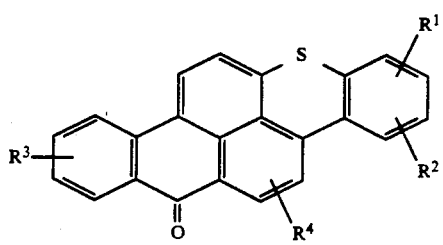

wherein
$R^1$ and $R^2$ independently of one another denote hydrogen, $(C_1-C_2)$-alkyl, $(C_1-C_2)$-alkoxy or chlorine and
$R^3$ and $R^4$ independently of one another denote hydrogen or bromine, by diazotisation and cyclisation of 3-(2'-aminophenyl-thio)-benzanthrones of the general formula II

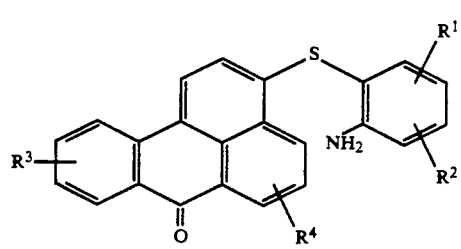

wherein $R^1$ to $R^4$ are defined as mentioned above, comprising the diazotisation and cyclisation are carried out simultaneously in polar, aprotic solvents in the present of water in amounts of 2% to 10% weight, based on the solvent.

2. Process according to claim 1 characterized in that $R^1$ to $R^4$ in the general formula I denote hydrogen.

3. Process according to claim 1 characterized in that the dialkylated acid amides, urea derivatives, sulphoxides, sulphones or alkylnitriles are employed as the polar, aprotic solvent.

4. Process according to claim 1 characterized in that N-methylpyrrolid-2-one is employed as the polar, aprotic solvent.

5. Process according to claim 1 characterized in that dimethylsulphoxide is employed as the polar, aprotic solvent.

6. Process according to claim 1 characterized in that the reaction is carried out at temperatures from 20° to 120° C.

7. Process according to claim 6 characterised in that the reaction is carried out at temperatures from 40° to 80° C.

8. Process according to claim 1 characterized in that the compound of the general formula II is initially introduced into the reaction vessel in the solvent, together with water and optionally acid, and the compound which supplies nitrosyl groups is added.

9. Process according to claim 1 characterized in that the compound of the general formula II is initially introduced into the reaction vessel in the solvent, together with water and an alkali metal nitrite, and an acid is added.

10. Process according to claim 1 characterized in that the compounds of the general formula II are first prepared by reaction of 2-aminothiophenols of the general formula III

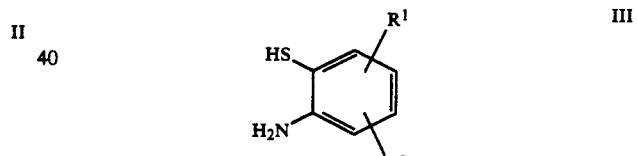

wherein $R^1$ and $R^2$ are as defined in claim 1, with 3-halogenobenzanthrones of the general formula IV

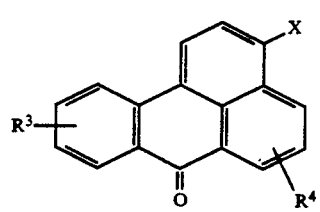

wherein X denotes chlorine or bromine and $R^3$ and $R^4$ are as defined in claim 1, in polar, aprotic solvents, and these products are diazotised and cyclised without intermediate isolation.

* * * * *